(12) United States Patent
Mendelson et al.

(10) Patent No.: US 8,392,267 B1
(45) Date of Patent: Mar. 5, 2013

(54) SYSTEM, METHOD, AND SOFTWARE APPLICATION FOR DYNAMICALLY GENERATING A LINK TO AN ONLINE PROCUREMENT SITE WITHIN A SOFTWARE APPLICATION

(75) Inventors: Neil S. Mendelson, Foster City, CA (US); Kenneth E. Hirschman, San Carlos, CA (US)

(73) Assignee: Mindjet LLC, San Francisco, CA (US)

( * ) Notice: Subject to any disclaimer, the term of this patent is extended or adjusted under 35 U.S.C. 154(b) by 165 days.

(21) Appl. No.: 12/803,601

(22) Filed: Jun. 29, 2010

Related U.S. Application Data (60) Provisional application No. 61/269,830, filed on Jun. 30, 2009.

(51) Int. Cl.
*G06Q 30/00* (2006.01)
(52) U.S. Cl. ....................................................... 705/26.1
(58) Field of Classification Search ............... 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 5,257,185 A | 10/1993 | Farley et al. | |
| 5,327,529 A | 7/1994 | Fults et al. | |
| 5,341,223 A | 8/1994 | Shigeeda et al. | |
| 5,548,749 A | 8/1996 | Kroenke et al. | |
| 5,555,357 A | 9/1996 | Fernandes et al. | |
| 5,597,312 A | 1/1997 | Bloom et al. | |
| 5,619,694 A | 4/1997 | Shimazu | |
| 5,627,979 A | 5/1997 | Chang et al. | |
| 5,787,417 A | 7/1998 | Hargrove | |
| 5,922,054 A | 7/1999 | Bibayan | |
| 5,948,040 A | 9/1999 | DeLorme et al. | |
| 5,966,123 A | 10/1999 | Kaplan | |
| 6,037,944 A | 3/2000 | Hugh | |

(Continued)

FOREIGN PATENT DOCUMENTS

| | | |
|---|---|---|
| EP | 0784263 | 7/1997 |
| EP | 1615145 | 1/2006 |

(Continued)

OTHER PUBLICATIONS

Altinkemer et al. "Online software distribution without enforcing copy protection as a strategic weapon", Aug. 2005, ISeB(2005) 3: 343-361.*

(Continued)

*Primary Examiner* — Naeem Haq
(74) *Attorney, Agent, or Firm* — Lessani Law Group, PC

(57) ABSTRACT

The present invention provides a system, method, and software application for providing a link to an online procurement site from within a supported software application. In one embodiment, when a user starts up a supported software application on a client computer, the client computer sends a request to a server for the Universal Resource Locator (URL) to use in the link. The server, which may be a server associated with a software vendor or the supported client application, determines whether or not the user of the client computer is associated with a business that has a procurement site from which the user can purchase a related application. If the server determines that the user is associated with a business that has a procurement site from which the user can purchase a related software application, then the server provides the client computer with the URL for the procurement site, and the supported client application generates a link to the procurement site.

22 Claims, 6 Drawing Sheets

U.S. PATENT DOCUMENTS

| | | | |
|---|---|---|---|
| 6,121,971 | A | 9/2000 | Berry et al. |
| 6,148,311 | A | 11/2000 | Wishnie et al. |
| 6,191,786 | B1 | 2/2001 | Eyzaguirre et al. |
| 6,377,287 | B1 | 4/2002 | Hao et al. |
| 6,405,225 | B1 | 6/2002 | Apfel et al. |
| 6,496,208 | B1 | 12/2002 | Bernhardt et al. |
| 6,507,848 | B1 | 1/2003 | Crosby et al. |
| 6,738,964 | B1 | 5/2004 | Zink et al. |
| 6,813,531 | B2 | 11/2004 | Coale et al. |
| 6,961,910 | B2 | 11/2005 | Lee et al. |
| 7,080,092 | B2 | 7/2006 | Upton |
| 7,181,438 | B1 | 2/2007 | Szabo |
| 7,313,766 | B2 | 12/2007 | Kautto Kiovula et al. |
| 7,502,994 | B2 * | 3/2009 | Kocol ..................... 715/205 |
| 7,543,299 | B2 | 6/2009 | Goodman et al. |
| 7,627,828 | B1 | 12/2009 | Collison et al. |
| 7,751,801 | B2 * | 7/2010 | Torvinen ................ 455/412.1 |
| 7,770,180 | B2 | 8/2010 | Villaron et al. |
| 8,041,604 | B1 * | 10/2011 | Glaser ..................... 705/14.4 |
| 8,145,537 | B2 * | 3/2012 | Wehmann et al. .......... 705/26.1 |
| 8,265,990 | B2 * | 9/2012 | Penberthy et al. ......... 705/14.1 |
| 2002/0030703 | A1 | 3/2002 | Robertson et al. |
| 2002/0049689 | A1 | 4/2002 | Venkatram |
| 2002/0049750 | A1 | 4/2002 | Venkatram |
| 2002/0076025 | A1 | 6/2002 | Liversidge et al. |
| 2002/0186238 | A1 | 12/2002 | Sylor et al. |
| 2003/0033274 | A1 | 2/2003 | Chow et al. |
| 2003/0065650 | A1 | 4/2003 | Annand et al. |
| 2003/0083922 | A1 | 5/2003 | Reed |
| 2003/0110253 | A1 | 6/2003 | Anuszczyk et al. |
| 2003/0137536 | A1 | 7/2003 | Hugh |
| 2003/0149681 | A1 | 8/2003 | Frees et al. |
| 2003/0233631 | A1 | 12/2003 | Curry et al. |
| 2003/0234808 | A1 | 12/2003 | Huang et al. |
| 2004/0003033 | A1 | 1/2004 | Kamen et al. |
| 2004/0030741 | A1 | 2/2004 | Wolton et al. |
| 2004/0093328 | A1 | 5/2004 | Damle |
| 2004/0193588 | A1 | 9/2004 | Tago et al. |
| 2004/0219493 | A1 | 11/2004 | Phillips |
| 2005/0038867 | A1 | 2/2005 | Henderson et al. |
| 2005/0132305 | A1 | 6/2005 | Guichard et al. |
| 2005/0147950 | A1 | 7/2005 | Ortiz et al. |
| 2006/0005164 | A1 | 1/2006 | Jetter et al. |
| 2006/0059135 | A1 | 3/2006 | Palmon et al. |
| 2006/0059143 | A1 | 3/2006 | Palmon et al. |
| 2006/0095474 | A1 | 5/2006 | Mitra et al. |
| 2006/0184886 | A1 | 8/2006 | Chung et al. |
| 2006/0285152 | A1 | 12/2006 | Skillen |
| 2007/0106974 | A1 | 5/2007 | Chafe et al. |
| 2007/0239680 | A1 | 10/2007 | Oztekin et al. |
| 2007/0266040 | A1 | 11/2007 | Figlin |
| 2008/0001948 | A1 | 1/2008 | Hirsch |
| 2008/0033882 | A1 * | 2/2008 | Kafkarkou et al. ............. 705/52 |
| 2008/0127169 | A1 | 5/2008 | Malasky et al. |
| 2008/0208885 | A1 | 8/2008 | Barber et al. |
| 2009/0119572 | A1 | 5/2009 | Koivunen |
| 2009/0287567 | A1 * | 11/2009 | Penberthy et al. ......... 705/14.43 |
| 2012/0095815 | A1 * | 4/2012 | Glaser ....................... 705/14.4 |
| 2012/0150644 | A1 * | 6/2012 | Shiely et al. ............... 705/14.53 |

FOREIGN PATENT DOCUMENTS

| | | |
|---|---|---|
| WO | 03014965 | 2/2003 |

OTHER PUBLICATIONS

Librelotto et al., Extreme Markup Languages 2007, Montreal, Quebec, Aug. 7-10, 2007, pp. 1-15.

Lu, Yiling, Roadmap for tool support for collaborative ontology engineering, University of Victoria, 2003, pp. 1-119.

"Mindjet MindManager 6 User's Guide" [Online] 2005, XP-002481935. Retrieved from the Internet: URL: http://www.mindjet.com/pdf-eng/MindManager_6_Help_Guide.pdf, pp. 4, 177-180.

Spanger, S., et al., "Mindmap: Utilizing Multiple Taxonomies and Visualization to Understand a Document Collection," Proceedings of the 35th Annual Hawaii International, 2001.

MindManager 2002 HelpFile, Mindjet LLC 2002, pp. 1, 9-12, 17, 22-23, 26, 35, 41, 46-47, 57, 61-66, 75-78, 82-84, 91, 105, 152, 157, 166, 178, 180-183, and 190, from URL: http://www.mindjet.com/pdf_eng/MM2002_Help_File_pdf.

Jelinek, Jodef, et al., "XML Visualization Using Tree Rewriting," Proceedings of the 20th Spring Conference on Computer Graphics, Apr. 22, 2004, Slovakia, XP002444098.

Delahousse, J., "Index and knowledge drawing: a natural bridge from Topic Maps to XML SVG", In Proceedings of XML USA 2001, Orlando, Dec. 2001.

Sumner, T., et al., "A Web Service Interface for Creating Concept Browsing Interfaces" D-Lib Magazine, Nov. 2004 vol. 10, No. 11, Nov. 2004, XP002580529 ISSN: 1082-9873.

"ThinkGraph: Introduction", Feb. 4, 2007. URL: http://www.thinkgraph.com.

Dokumentation zum Lernprogramm Mindmapping mit Freemind, Dec. 1, 2007, p. 63. URL: http://www.portal.schule.bremen.de/dokumente/loadzip/65760_v_0/projects/doc/lem-materialfreemind.pdf.

Kolas, L., "Topics Maps in E-Learning: An Ontology Ensuring an Active Student Role as Producer", Proceedings of World Conference on E-Learning in Corporate, Government, Healthcare, and Higher Education 2006, pp. 2107-2113.

* cited by examiner

SYSTEM, METHOD, AND SOFTWARE APPLICATION FOR DYNAMICALLY GENERATING A LINK TO AN ONLINE PROCUREMENT SITE WITHIN A SOFTWARE APPLICATION

RELATED APPLICATIONS

This application claims the benefit of U.S. Provisional Application No. 61/269,830, filed on Jun. 30, 2009 with inventor Neil S. Mendelson, and titled "System, Method, and Software Application for Dynamically Generating a Link to an Online Procurement Site within a Software Application," the contents of which are incorporated by reference as if fully disclosed herein.

BACKGROUND OF THE INVENTION

1. Field of the Invention

This invention relates generally to software procurement, and, more specifically to dynamically providing a link to an online procurement site from within a supported software application, wherein a related software program can be purchased from the procurement site.

2. Description of the Background Art

Many enterprise businesses have negotiated discounts from vendors for hardware and software products that are used by their employees. Such businesses often have online procurement sites from which their employees can purchase hardware and software products for their work. Businesses want employees to purchase from their procurement sites to ensure the business obtains the negotiated price for the hardware/software products.

Many software vendors offer free/trial versions of their software to entice users to purchase non-trial versions for a license fee. Currently, when an employee of a business with a procurement site is using a trial version of a software and want to purchase a non-trial version, the user cannot tell from the trial version whether or not the software can be purchased from the company's procurement site. The employee must independently check the procurement site. Therefore, there is a need for a system and method that enables business employees to more efficiently purchase software from the company's procurement site.

SUMMARY

The present invention provides a system, method, and software application for dynamically providing a link to an online procurement site from within a supported software application. From the online procurement site, a user can purchase a related software application. For example, the supported application may be a trial application, and the related application may be the non-trial version available for a license fee.

In one embodiment, when a user starts up a supported software application on a client computer, the client computer sends a request to a server for the Universal Resource Locator (URL) to use in the link. The server, which may be a server associated with a software vendor of the supported client application, determines whether or not the user of the client computer is associated with a business that has a procurement site from which the user can purchase a related application. In one embodiment, the server makes this determination based on the IP address or the domain of the client computer. If the server determines that the user is associated with a business that has a procurement site from which the user can purchase a related software application, then the server provides the client computer with the URL for the procurement site. Otherwise, the server may provide the client computer with a URL to default website (e.g., a website associated with the software vendor) from which the user can purchase a related application. The supported application uses the URL (or URLs) provided by the server to dynamically generate a link to either the procurement site or the default site (as applicable).

In an alternate embodiment of the invention, a link from within an email message or website can be used to dynamically direct a user to either an online procurement site or a default website. Furthermore, the invention can be applied to generating links to purchase any type of product, including hardware.

DETAILED DESCRIPTION OF THE PREFERRED EMBODIMENTS

Figure 1:
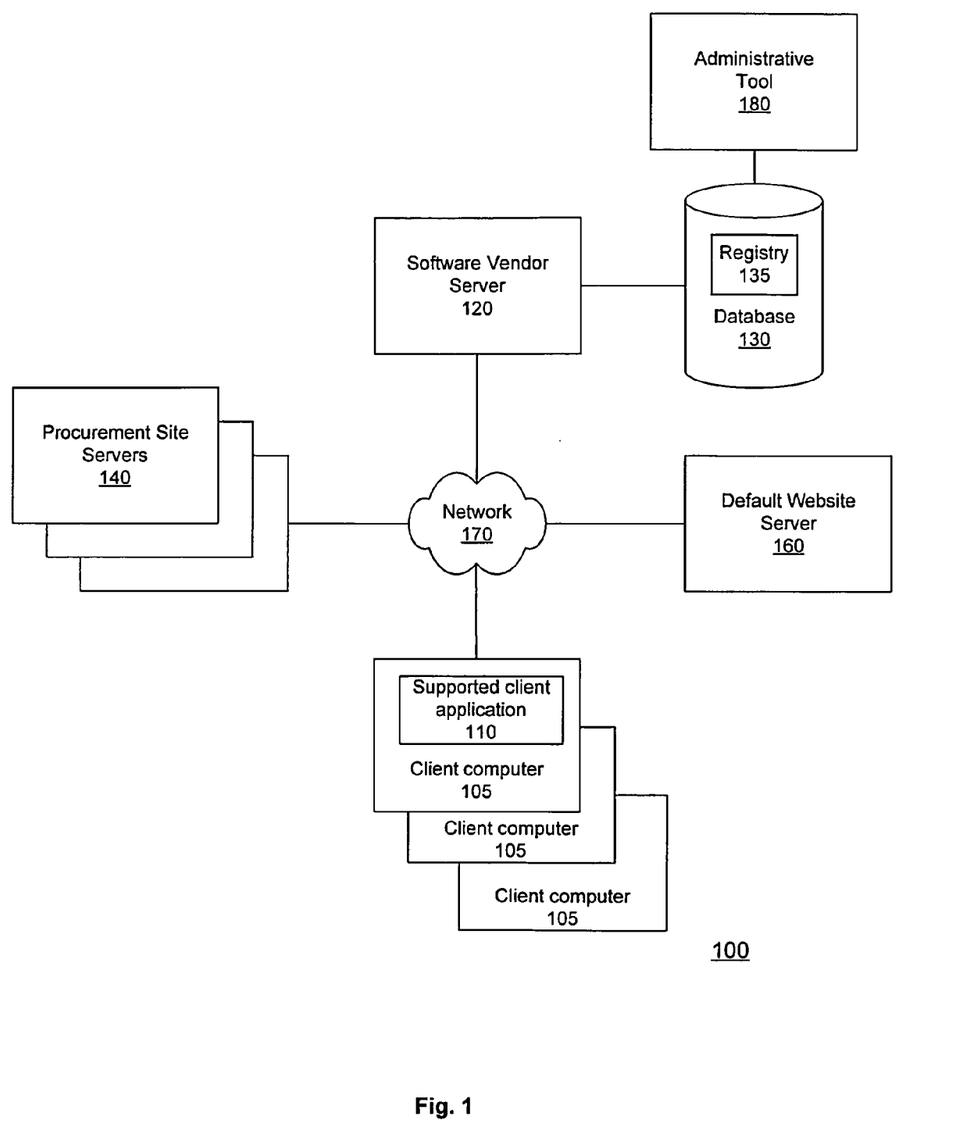
FIG. 1 is a block diagram of an example network in which the present invention may be implemented.

FIG. 1 illustrates an example network in which the present invention may be implemented. Network 100 is intended to be only an example and not limiting of the invention.

Network 100 includes client computers 105 that are running supported client applications 110. A supported client application 110 is an application that is designed to dynamically generate a hyperlink to a site from which a user can purchase or try a software application that is related to the supported client application. An example of a supported client application is a free version of a software application, or a trial version of a software application. If the supported client application is a free software application, then an example of a related application is an application that has the same functionality as the free application plus additional functionality. If the supported client application is a temporary trial application, then the related application may be the non-trial version available for a license fee. Also, a related application may be a software upgrade to an existing supported client application.

Supported client applications can be any type of application that is used by a user. Supported client applications can include, but are not limited to, mobile applications, desktop applications, and web browser-based applications (i.e., applications run within a web browser). Supported client applications can include, but are not limited to, word processing applications, spreadsheet applications, slide presentation applications, computer-aided drawing applications, video or graphics creation/editing applications, website-creation applications, database management programs, and mind mapping applications.

In FIG. 1, client computer 105 and supported client applications 110 are "clients" because they are capable of being served by server 120. In response to a user starting a supported client application 110, server 120 provides a URL to such supported client application 110, wherein the URL is the URL for a site from which a user can elect to try or buy a software application that is related to the supported client application 110. The URL is used by the supported client application 110 to create the hyperlink that is displayed in the user interface of the supported client application 110.

Server 120 may access a registry 135 in database 130 to retrieve the appropriate URL. An administrator for server 120 may user an administrative software tool 180 to add, delete, and modify URL information in registry 135.

Procurement sites servers 140 represent servers that serve procurement sites associated with businesses. A procurement site is an online site set up by a business for the purchase of hardware and/or software for its employees. For example, businesses may have specific procurement sites from which employees and contractors can purchase third party software or hardware. With respect to this application, a business is any entity which employs or contracts workers (including, but not limited to, government entities).

Default website server 160 provides a default website from which a user may purchase software related to the supported client application 110. In an alternate embodiment, server 120 and server 160 may be the same server.

Supported client applications 110, server 120, default website server 160 and procurement site servers 140 are connected via network 170, which may be the Internet, a private network, or combination of both.

Figure 2:
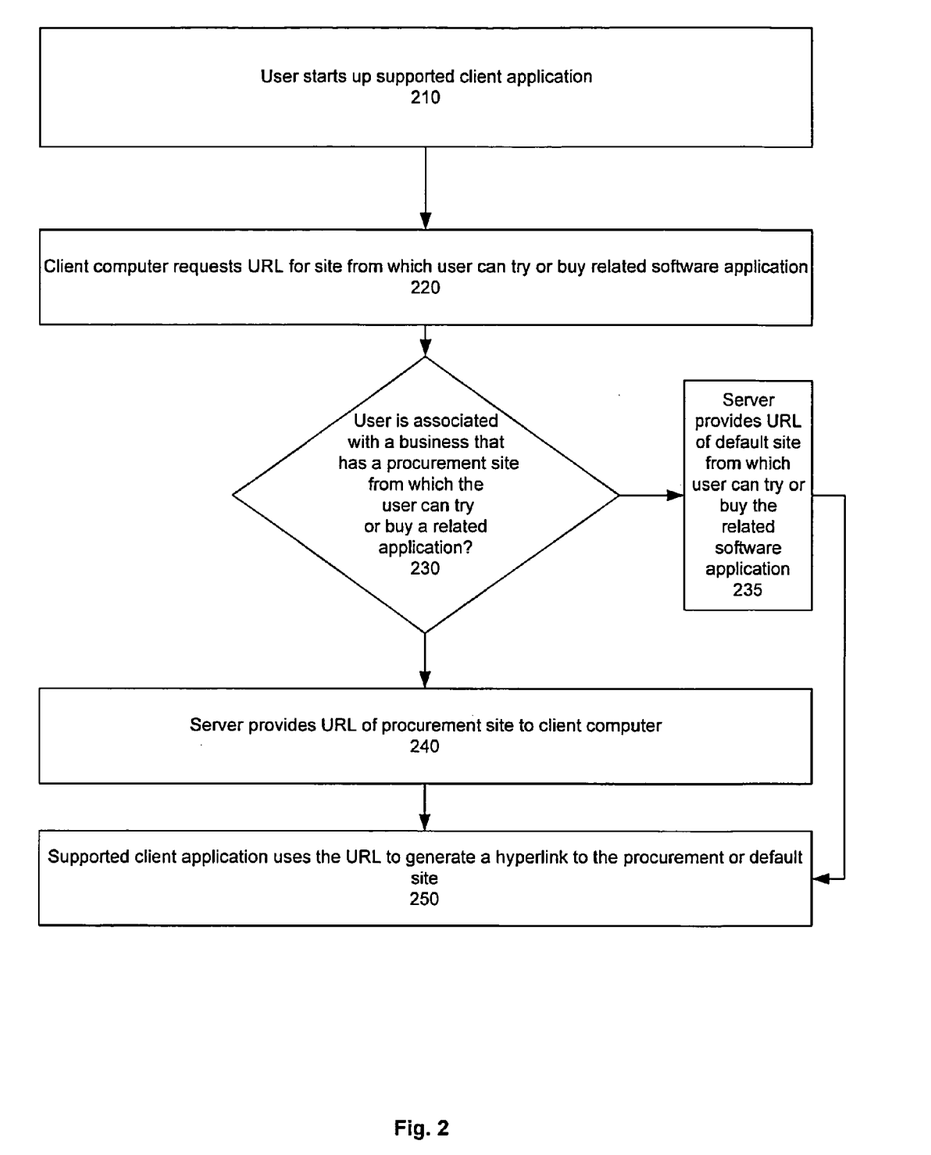
FIG. 2 is a flowchart that illustrates a method according to one embodiment of the present invention.

FIG. 2 illustrates a method, according to one embodiment of the present invention, for dynamically providing a link to an online procurement site from within a supported software application, wherein a related software application can be purchased from the procurement site. For example purposes, this method will be described with respect to network 100 in FIG. 1, but this method can be implemented in other network configurations. The supported client applications 110 include software code that enables the client computers 105 to request a URL from server 120 for the purpose of displaying a hyperlink within the user interface of the supported client application. In response to a user starting a supported software application 110 (step 210), the client computer 105 requests a URL from server 120, wherein the URL is for a site from which the user of the supported software application can purchase or try a related software application (step 220). In response to the request for the URL from the client computer 105, the server 120 determines whether or not the user of the client computer 105 is associated with a business that has a procurement site from which the user can try or buy a related software application (step 230). There are a variety of ways in which the server can make this determination, including, based on the domain and/or IP address of the client computer, as is described in more detail below.

If the server 120 determines that the user is associated with a business that has a procurement site from which the user can elect to try or buy a related software application, the server 120 provides the URL to the procurement site 140 to the client computer 105 (step 240), and, as described below, the supporting client application 110 displays a hyperlink to the procurement site 140 in the user interface of the supported client application (step 250). The server 120 may provide the client computer 105 with one URL or multiple URLs (e.g., one for a "try" button or a "buy" button).

The supported client application 110 dynamically generates a display of the hyperlink upon start up, after receipt of the URL from server 120. The way in which the hyperlink is displayed can depend on the information provided by the server 120 in association with the URL. In one embodiment, the hyperlink is displayed as "try" or "buy" button. If the server 120 provides the client computer 105 with multiple URLs, then the supported client application 110 may display a hyperlink for each URL (e.g., both a "try" and a "buy" button). The server 120 may provide image(s) along with the URL, wherein the images are used by the supported client application as part of the hyperlink display. For example, the images may be images for the buttons that represent the hyperlink.

In one embodiment, if the server 120 is not able to determine that the user is associated with a business that has a procurement site from which the user can elect to buy or try a related software application, the server 120 provides the client computer 105 with a URL to a default website from which the user can buy or try a related software application (step 235). The supporting client application 110 then displays a hyperlink to such default website (step 250). As discussed above, in one embodiment, such hyperlink can be displayed in the form of buttons labeled with "try," "buy" or similar terms.

In an alternate embodiment, if the server 120 is unable to determine that the user is associated with a business that has a procurement site from which the user can purchase a related application, then the server 120 does not provide the client computer 105 with a URL. In such case, the supporting client application 110 does not display a link to a site in which a user can purchase or try a related application.

Figure 3:
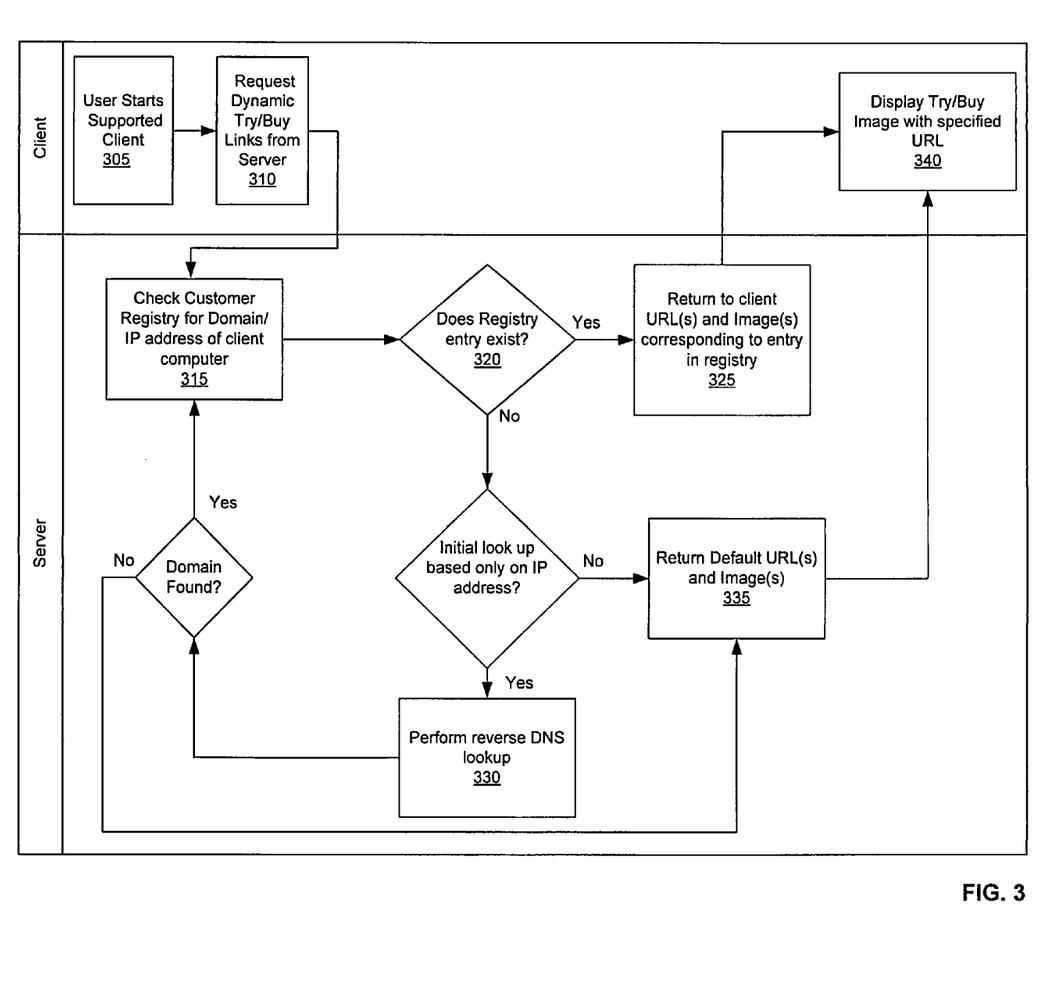
FIG. 3 is a flowchart that illustrates a method according to one embodiment of the present invention.

FIG. 3 illustrates an example of how server 120 can determine whether or not a user of a client computer is associated with a business that has a procurement site from which a user can purchase a related application. A user starts a supported client application 110 (step 305), and the client computer requests from the server dynamic try/buy links to display with the user interface (step 310). The request from the client includes the IP address of the client computer, and, in some cases, the domain of the client computer. The server 120 determines whether or not the IP address or domain of the client computer is in the registry 135 (steps 315 and 320). In this example, registry 135 includes a list of domains and IP addresses that are associated with business procurement sites. In one embodiment, each entry in the registry has the following fields:

Company name (i.e., name of business having procurement site)
One or more of the following:
  Domain name
  IP address
  Type and version of supported client application or related application to which the entry applies (e.g., "MindManager 8.0 for Windows").
  "Try" URL (i.e., the URL to a site from which a user can try a related software application). If this field is empty, it is not replaced with a default URL. In other words, if this field is empty, the client application does not display a "try" button.
  "Try" Image. This is an image that the supported client application can use to display the Try URL.
  "Buy" URL (i.e., the URL to a site from which a user can buy a related software application). If this field is empty, it is not replaced with a default URL.
  "Buy" Image. This is an image that the supported client application can use to display the Buy URL.

If the IP address or domain of the client computer is in the registry 135, the server 120 returns to client computer 120 the URLs and images (if any) corresponding to the IP address/domain in the registry (step 325).

In some cases, the original request from the client computer 105 may include only the IP address of the client computer and not the domain. If the initial look up in registry 135 was based on the IP address and the IP address was not in the registry 135, then the server 120 performs (or initiates) a reverse DNS lookup to identify the domain of the client computer 105 (step 330). If the domain is found, then server 120 repeats the steps 315 and 320 with the domain.

The server 120 may also look at other fields in the registry (e.g., type of supported client application) to determine whether the request from client computer 105 matches an entry in the registry 135.

In one embodiment, if the server is unable to find a matching entry in the registry 135, the server 120 returns a default URL (and, if available, images associated with the URL) to the client computer 120 (step 335). The default URL is a URL to a default site from which a user can elect to purchase or try a related application to the supported client application. For example, this may be a URL to the website of a software vendor that sells the related software application.

In response to the client computer receiving a URL from the server 120, the supported client application 110 displays a hyperlink for the URL in the user interface of the supported client application 110 (step 340). If images are provided along with the URL, then the images are used to display the hyperlink. For example, the hyperlink may be displayed as try/buy buttons, and the images may be graphics for the buttons.

In one embodiment, the supported client application 110 locally stores the URL(s) received from the server 120 on the client computer 105. In such embodiment, the next time the supported client application starts up (after receiving a URL(s) from the server in a previous start), the supported client application retrieves the locally stored URL(s) instead of requesting a URL from the server 120.

As stated above, the example network 100 includes a software tool that enables an administrator to edit registry 135. Such software tool enables the user to add new entries to the registry, delete entries, and edit entries. In one embodiment, the software tool ensures that any domains entered are valid (e.g., the tool does not allow an administrator enter a non-publicly registered domain), that URLs are properly formatted, and that images added to the registry meet any dimension requirements. The tool may also have the following additional capabilities:

Support for wildcards for domain definitions (e.g., *.domain.*, which would allow incoming requests from subdomains and other countries (e.g., de, fr, etc.) to be resolved with a single entry in the registry 135.

Support subdomains (e.g., consulting.companyA.com vs. companyA.com)

Figure 4:
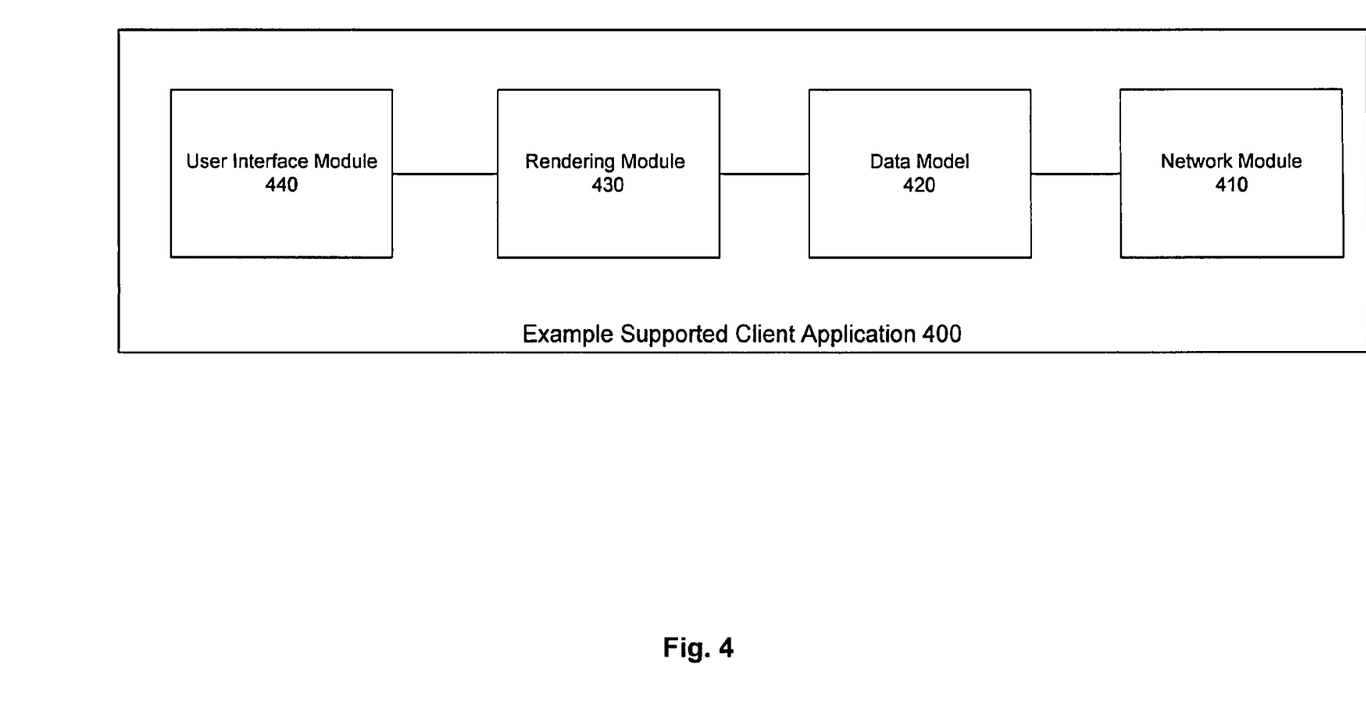
FIG. 4 is a block diagram that illustrates an example software architecture for an example supported client application.

Upload mechanism to import custom graphics (PNG) for the Try and/or Buy buttons or other images FIG. 4 is a block diagram that illustrates the software architecture of an example supported client application 400. This is only example, and the invention is in no way limited to this example. The supported client application 400 has a network module 410 that is able to make network/Internet requests for additional information. In this example, the network module 410 requests the URL from server 120 when the user starts the supported client application 400. The supported client application 400 includes a data model 420 in which data, including the URL from server 120, for the supported client application 400 is loaded. A rendering module 430 is responsible for displaying the data, including the hyperlink for the URL, in the user interface. The user interface module 440 enables a user to interact with the supported client application 400.

Figure 5:
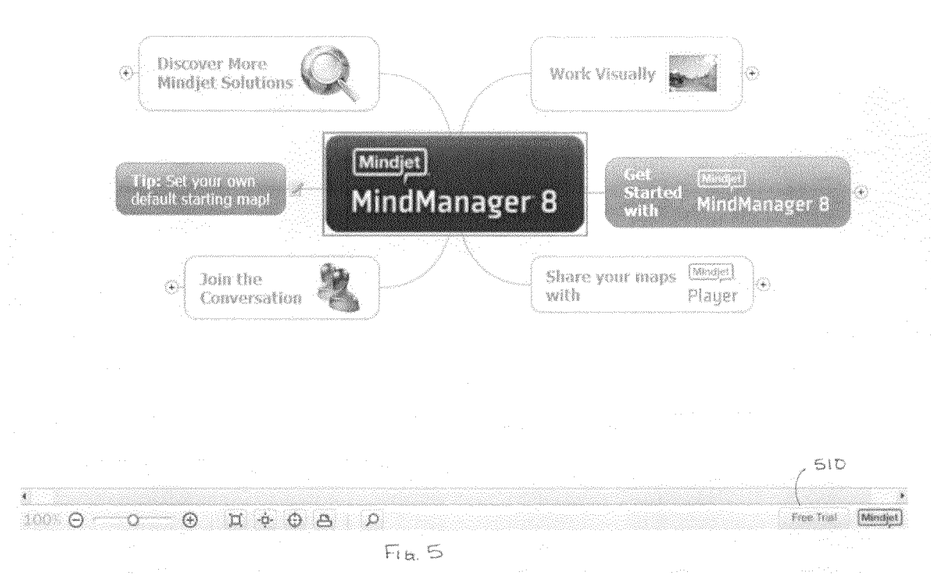
FIG. 5 is a screen shot that illustrates an example user interface a try link.

FIG. 5 illustrates an example of a user interface of a mind mapping application that includes a "free trial" button 510 from which a user can try or purchase a related mind mapping application.

In addition to making it more efficient to purchase software, the present invention can be used to promote new software releases. For example, if a new software upgrade to the supported application is available, then the supported client application can display buy/try links for the upgrade. In such case, if the supported client application is a non-trial software application (e.g., a license fee has already been paid for the supported client application 110), the server 120 may only return a URL to the supported client application 110 if an upgrade to the supported client application is available. If the server does not return a URL, the supported client application does not generate link to a procurement/purchase site.

Figure 6:
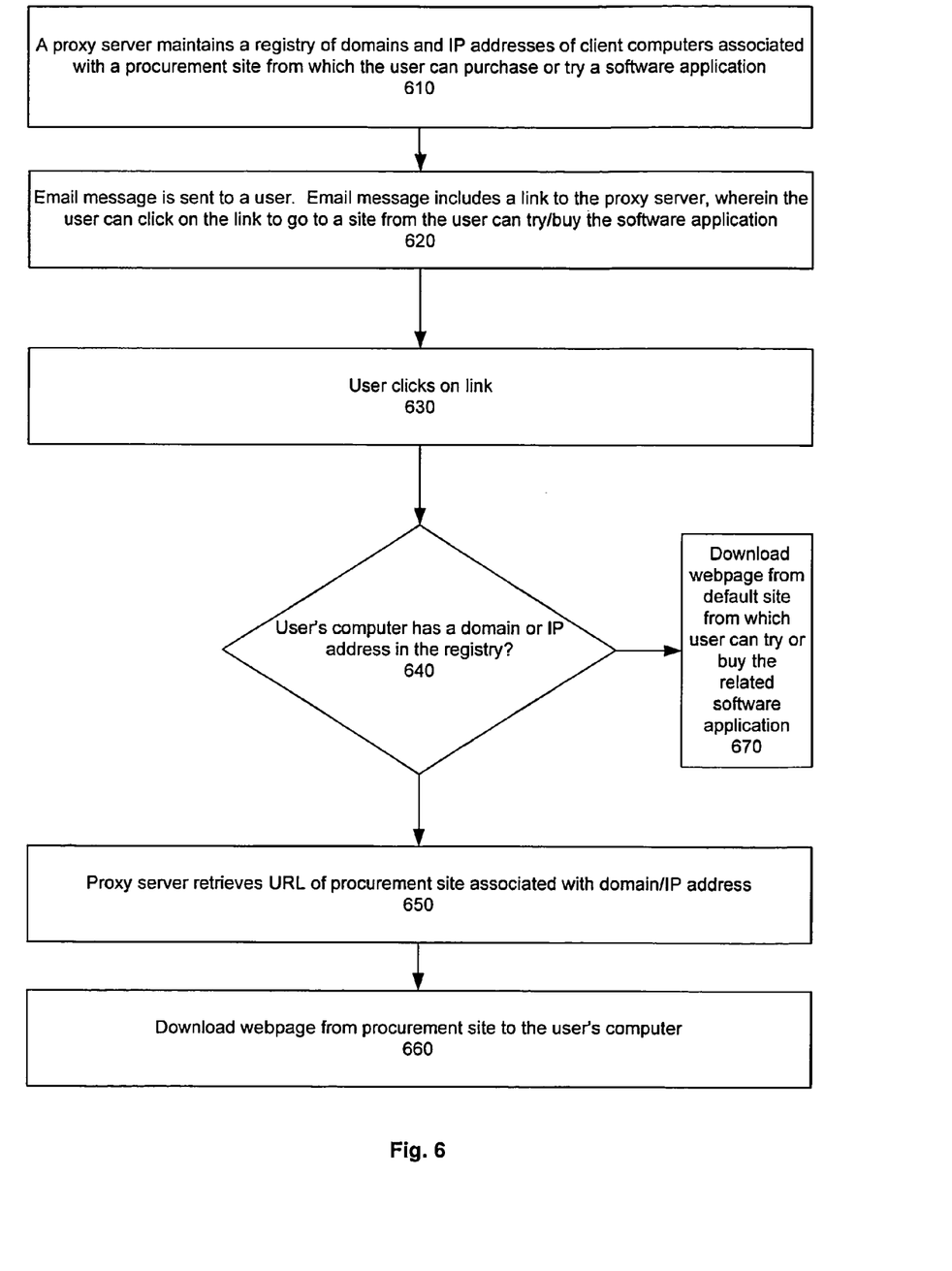
FIG. 6 is a flowchart that illustrated an alternate method according to the present invention.

In an alternate embodiment of the invention, a link from within an email message or website can be used to dynamically direct a user to either an online procurement site or a default website. FIG. 6 illustrates an example of this embodiment of the invention with respect to an email message. A proxy server maintains a registry of domains and IP addresses of client computers associated with a procurement site from which the user can purchase or try a software application (step 610). An email message is sent to a user that includes a link to the proxy server, wherein the user can click on the link to go to a site from which the user can try or buy the software application (step 620). In response to the user clicking on the link (step 630), the proxy server determines whether or not the user's computer has a domain or IP address within the registry (step 640). If so, the proxy server retrieves a URL to a procurement site associated with such domain or IP address (step 650). The procurement site webpage is then downloaded to the user's computer (step 660). If neither the domain nor the IP address of the user's computer is found in the registry, a default website page from which the user can try or buy the software is downloaded to the user's computer (step 670). Steps 610 and 630-670 also can be used to dynamically direct a user to a procurement site or the default website from a link in another website.

The purpose of step 640 is to determine whether or not the user is associated with a business that has a procurement site. Domains and IP addresses are not the only way to determine this, and other methods can be used. For example, the user's email address may used to determine if a user is associated with a business that has a procurement site.

In a further alternate embodiment of the invention, any of the methods described above are used to generate links from which a user can purchase any type of product, including products other than software applications.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for providing a link to an online site from within a supported software application, wherein a related software program can be purchased from the online site, the method comprising:

in response to a user starting the supported software application, determining whether or not the user is associated with a business that has a procurement site from which the user can try or buy a related software application, wherein determining comprises determining whether or not the user's computer has an IP address that is associated with a business that has a procurement site from which the user can elect to try or buy related software;

in response to determining that the user is associated with a business that has a procurement site from which the user can elect to try or buy a related software application, displaying a hyperlink to the procurement site in the user interface of the supported software application; and in response to not being able to determine that the user is associated with a business that has a procurement site from which the user can elect to try or buy a related software application, displaying a hyperlink to a default site from which the user can buy or try a related software application.

2. The method of claim 1, wherein the determining step comprises:
    determining whether or not the user's computer is from a domain that is associated with a business that has a procurement site from which the user can elect to try or buy related software.

3. The method of claim 1, wherein the hypertext link is in the form of a button.

4. The method of claim 3, wherein the button is for trying the related software.

5. The method of claim 3, wherein the button is for buying the related software.

6. The method of claim 1, wherein displaying a hyperlink comprises displaying both a button for trying the related software and a button for buying the related software.

7. The method of claim 1, wherein the supported software application is a trial version of the related software application.

8. The method of claim 1, wherein the supported software application is a free software application, and the related software application has more functionality than the supported software application and is available for a license fee.

9. The method of claim 1, wherein the supported software application is run within a web browser.

10. The method of claim 1, wherein the supported software application is a desktop application.

11. A method for dynamically providing a link to an online site from within a supported software application running on a client computer, wherein a related software program can be purchased from the online site, the method comprising:
    maintaining a registry of domains and IP addresses of client computers having a procurement site from which a user can purchase or try the related software application;
    in response to a user starting the supported software application on the client computer, determining whether or not the client computer has a domain or IP address within the registry; and
    in response to finding the domain or IP address of the client computer in the registry, retrieving a URL to a procurement site in the registry corresponding to such domain or IP and using the URL to display a hyperlink to the procurement site within the user interface of the supported client application.

12. The method of claim 11, further comprising:
    in response to the domain of the client computer not being in the registry, retrieving a URL to a default website from which a user can purchase the related software application and using the URL to display a hyperlink to the default website within the user interface of the supported client application.

13. The method of claim 11, wherein the hypertext link is in the form of a button.

14. The method of claim 13, wherein the button is for trying the related software.

15. The method of claim 13, wherein the button is for buying the related software.

16. The method of claim 11, wherein displaying a hyperlink comprises displaying both a button for trying the related software and a button for buying the related software.

17. The method of claim 11, wherein the supported software application is a trial version of the related software application.

18. The method of claim 11, wherein the supported software application is a free software application, and the related software application has more functionality than the supported software application and is available for a license fee.

19. The method of claim 11, wherein the supported software application is run within a web browser.

20. The method of claim 11, wherein the supported software application is a desktop application.

21. A method for dynamically providing a link within an email message to an online site from which a user can purchase or try a product, the method comprising:
    maintaining on a proxy server a registry of domains and IP addresses of client computers associated with a procurement site from which a user can purchase or try the product;
    providing a link to the proxy server from within an email message on a client computer;
    in response to a user clicking on the link, determining at the proxy server whether or not the client computer has a domain or IP address within the registry;
    in response to finding the domain or IP address of the client computer in the registry, retrieving a URL to a procurement site in the registry corresponding to such domain or IP and downloading a webpage from the procurement site to the client computer; and
    in response to not finding the domain or IP address of the client computer in the registry, downloading a webpage from a default website from which the user can purchase or try the product to the client computer.

22. A method for dynamically providing a link within a website to another online site from which a user can purchase or try a product, the method comprising:
    maintaining on a proxy server a registry of domains and IP addresses of client computers associated with a procurement site from which a user can purchase or try the product;
    providing a link to the proxy server from within the website;
    in response to a user clicking on the link, determining at the proxy server whether or not the user's computer has a domain or IP address within the registry;
    in response to finding the domain or IP address of the user's computer in the registry, retrieving a URL to a procurement site in the registry corresponding to such domain or IP and downloading a webpage from the procurement site to the user's computer; and
    in response to not finding the domain or IP address of the client computer in the registry, downloading a webpage from a default website from which the user can purchase or try the product to the user' computer.

* * * * *